(12) United States Patent
Jain et al.

(10) Patent No.: US 11,411,832 B2
(45) Date of Patent: Aug. 9, 2022

(54) METHODS AND APPARATUS TO GENERATE OPTIMIZED MODELS FOR INTERNET OF THINGS DEVICES

(71) Applicant: Intel Corporation, Santa Clara, CA (US)

(72) Inventors: Nilesh Jain, Portland, OR (US); Vui Seng Chua, Penang (MY); Fahim Mohammad, Hillsboro, OR (US); Anindya Paul, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 701 days.

(21) Appl. No.: 16/236,290

(22) Filed: Dec. 28, 2018

(65) Prior Publication Data

US 2019/0140911 A1    May 9, 2019

(51) Int. Cl.
| | | |
|---|---|---|
| *H04L 41/14* | (2022.01) | |
| *G06N 20/00* | (2019.01) | |
| *G06N 7/00* | (2006.01) | |
| *H04L 43/022* | (2022.01) | |
| *H04L 43/16* | (2022.01) | |
| *H04L 41/16* | (2022.01) | |
| *H04L 67/12* | (2022.01) | |
| *H04W 4/38* | (2018.01) | |
| *H04W 4/70* | (2018.01) | |

(52) U.S. Cl.
CPC ........... *H04L 41/145* (2013.01); *G06N 7/005* (2013.01); *G06N 20/00* (2019.01); *H04L 41/16* (2013.01); *H04L 43/022* (2013.01); *H04L 43/16* (2013.01); *H04L 67/12* (2013.01); *H04W 4/38* (2018.02); *H04W 4/70* (2018.02)

(58) Field of Classification Search
CPC ..... H04L 41/145; H04L 41/16; H04L 43/022; H04L 43/16; H04L 67/12; H04W 4/38; H04W 4/70; G06N 20/00; G06N 7/005
USPC .......................................................... 706/12
See application file for complete search history.

(56) References Cited

U.S. PATENT DOCUMENTS 9,781,243 B1 * 10/2017 Huang ..................... H04W 4/70
9,860,257 B1 *  1/2018 Kumar ................ H04L 63/1458
(Continued)

OTHER PUBLICATIONS

NXP, "NXP Sensor Fusion Library for Kinetis MCUs," NXP Sensor Fusion Release 7.00, Document No. NSFK_DS, Rev. 0.8, Aug. 2016, 39 pages.

(Continued)

*Primary Examiner* — Tauqir Hussain
(74) *Attorney, Agent, or Firm* — Hanley, Flight & Zimmerman, LLC

(57) ABSTRACT

Example systems, methods, and apparatus to generate optimized models for Internet of Things device are disclosed. An example apparatus includes a data receiver to collect data from a sensor of an internet of things device based a first sampling frequency and a buffer having a first buffer size; a model trainer to train a model based on the data collected from the sensor; a buffer analyzer to select a second sampling frequency and to reduce the buffer to a second buffer size, the model trainer to update the model based on the second buffer size; and a platform analyzer to: determine a duration of time that that internet of things device will take to analyze sensor data based on the updated model.

28 Claims, 7 Drawing Sheets

(56) References Cited

U.S. PATENT DOCUMENTS

| | | | |
|---|---|---|---|
| 2015/0039405 A1* | 2/2015 | Frank | G06Q 50/01 |
| | | | 705/12 |
| 2015/0040149 A1* | 2/2015 | Frank | G06Q 10/00 |
| | | | 725/10 |
| 2017/0187597 A1* | 6/2017 | Nolan | H04L 43/065 |
| 2017/0187625 A1* | 6/2017 | Nolan | H04L 47/263 |
| 2017/0187642 A1* | 6/2017 | Nolan | H04W 4/70 |
| 2017/0201099 A1* | 7/2017 | Savanth | H02J 50/001 |
| 2020/0090070 A1* | 3/2020 | Bhattacharyya | G06N 7/023 |
| 2020/0104458 A1* | 4/2020 | Chuang | G06F 30/394 |
| 2020/0146130 A1* | 5/2020 | Özcan | H04W 52/0212 |
| 2020/0336878 A1* | 10/2020 | Chieh Tseng | H04W 52/0203 |
| 2021/0191494 A1* | 6/2021 | Rotem | G06F 1/324 |
| 2022/0004913 A1* | 1/2022 | Nakae | A61B 5/483 |

OTHER PUBLICATIONS

MATLAB & Simulink, "Introduction to Code Generation with Feature Matching and Registration," https://www.mathworks.com/help/vision/examples/introduction-to-code-generation-with-feature-matching-and-registration.html, retrieved on May 20, 2020, 5 pages.
MATLAB & Simulink, "Code Generation for Tracking and Sensor Fusion," https://www.mathworks.com/help/driving/examples/code-generation-for-tracking-and-sensor-fusion.html, retrieved on May 20, 2020, 5 pages.

\* cited by examiner

METHODS AND APPARATUS TO
GENERATE OPTIMIZED MODELS FOR
INTERNET OF THINGS DEVICES

FIELD OF THE DISCLOSURE

This disclosure relates generally to internet of things devices, and, more particularly, to methods and apparatus to generate optimized models for internet of things devices.

BACKGROUND

The Internet of Things (IoT) refers to the networking of electronic devices for the sharing of data to allow devices to connect, interact, and share data. The electronic devices that are part of the Internet of Things may be computing devices such as laptops, desktop computers, smartphones, and tablets, but are often devices that have not traditionally included networking and/or processing capabilities such as home appliances, vehicles, embedded computing devices, wearable devices, etc.

BRIEF DESCRIPTION OF THE DRAWINGS

In general, the same reference numbers will be used throughout the drawing(s) and accompanying written description to refer to the same or like parts.

DETAILED DESCRIPTION

Sensing, recognition and analytics are being used for many different applications today in wearable and IoT markets. Sensors are being added to virtually every person, place and thing. Due to the amount of data generated by such devices, analyzing the data locally at the sensing devices to recognize the patterns and translate them into insights and value is advantageous to transferring the significant amount of data to a central server for analysis. However, IoT/wearable devices often have limited computing resources, limited battery life, etc. to reduce device cost and/or size.

A lot of wearable/IoT innovation is happening around fusing various sensor inputs to gain greater insights and value to customers. For example, to understand pets (e.g. dogs) physiological condition, sound and motion data may be fused to improve overall quality of pet's life, food intake, bonding between owner and pet, etc. Similarly, audio data and motion data may be combined to improve remote elderly patient or child monitoring (e.g. fall detection, prevention, etc.). Another potential application in industrial environments is use in a smart factory where mixing sound data with motor vibration data can be used for robust predictive analytics.

To perform combined analysis at IoT devices or other devices with limited capabilities, analysis processes to be executed on the devices must be optimized. Methods and apparatus disclosed herein facilitate the generation of optimized models to be applied by devices such as IoT devices to simultaneously analyze multi-modal data (e.g., to perform an analysis of a combination of audio data and motion data in an embedded IoT device). An analysis in accordance with some of the examples disclosed herein includes band limiting data (e.g., audio data) without signal aliasing as part of sampling frequency selection.

An analysis in accordance with some of the examples disclosed herein includes optimal buffer memory selection for each sensor type and frequency to avoid information loss. An analysis in accordance with some of the examples disclosed herein includes selection of low compute and memory foot print data pre-processing and features (e.g., using fixed point implementation and use of custom instructions to lower memory footprint and bandwidth without affecting the quality of the analysis). An analysis in accordance with some of the examples disclosed herein includes integrating machine learning accelerators to perform sense making (e.g., deriving valuable analysis results from data) within strict power and latency budget. According to some examples, such analysis aspects are provided by an iterative process to develop optimized models and analysis parameters for use by data collection device such as IoT devices.

Figure 1:
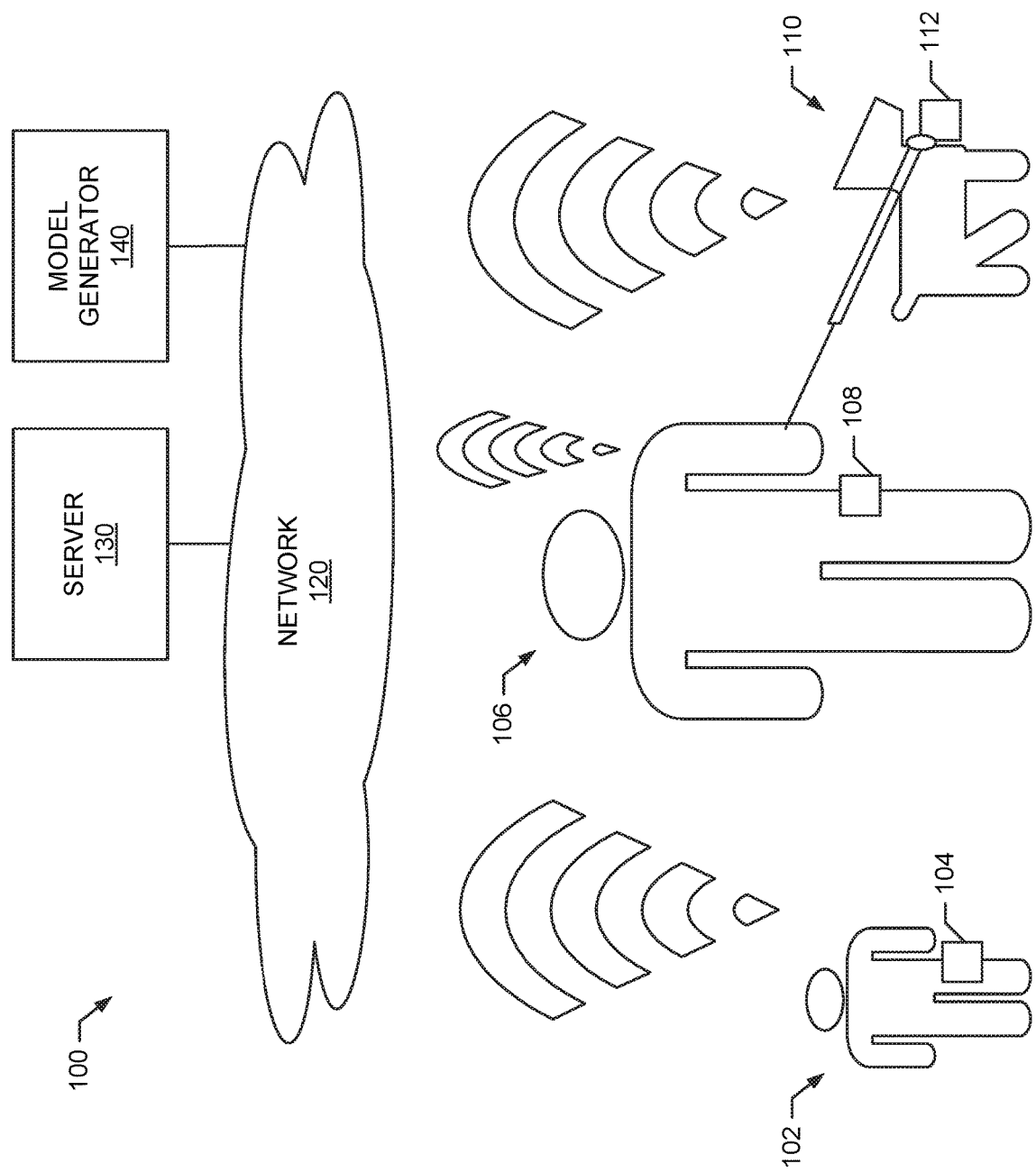
FIG. 1 is a block diagram of an example environment in which internet of things devices communicate with a server.

FIG. 1 is a block diagram of an example environment 100 in which objects (e.g., an example child 102, an example adult 106, and an example pet 110) are monitored by example IoT devices 104, 108, and 112, respectively). The example environment 100 further includes an example network 120, an example server 130, and an example model generator 140.

The example IoT devices 104, 108, and 112 of FIG. 1 include sensors to collect data associated with the example child 102, the example adult 106, and the example pet 110, respectively, and/or the surrounding environments. For example, the example IoT devices 104, 108, and 112 of FIG. 1 include audio sensors and motion sensors. The example IoT devices 104, 108, and 112 analyze collected data and transmit the result of the analysis to the example server 130 via the example network 120. According to the illustrated example, the IoT devices 104, 108, and 112 are wearable devices (e.g., including components for attaching to a belt, attaching to a collar, dimensioned to be inserted in a pocket, embedded in a being or product, attached to a being or product, etc.). Alternatively, the IoT devices 104, 108, and 112 may be any other type of devices to collect data about any other type of environment.

According to the illustrated example, the IoT devices 104, 108, and 112 include the capability to analyze collected data to develop characterizations, determine results, make decisions, detect conditions, etc. The example IoT devices 104, 108, and 112 perform such analysis by conducting parallel analysis of the results of multiple sensors. According to the illustrated example, the IoT devices 104, 108, and 112 perform the analysis by buffering sensor data, performing pre-processing, extracting features from the pre-processed sensor data, and applying a classification model to classify the data. According to the illustrated example, the IoT devices 104, 108, and 112 implement a majority voting approach by aggregating results of multiple classifications (e.g., multiple classifications over a period of time) to determine final classifications.

The example IoT devices 104, 108, and 112 include a multiple pipeline approach to analyzing data from multiple sensors in order to perform simultaneous or substantially simultaneous analysis and classification of the data. For example, the IoT devices 104, 108, and 112 may include a pipeline for each sensor that includes data capture, data buffering, data pre-processing, feature extraction, and classification.

The example network 120 is the Internet, which communicatively couples the example IoT devices 104, 108, and 112, the example server 130, and the example model generator 140. Additionally or alternatively, the network 120 may include a wired network, a wireless network, a local area network, a wide area network, a cellular network, a WiFi network, a short-range wireless protocol network, etc.

The example server 130 of the illustrated example is a destination to which the example IoT devices 104, 108, and 112 transmit collected and/or generated information. According to the illustrated example, the IoT devices 104, 108, and 112 transmit information that is the result of classification(s) of sensor data (e.g., a classification of the health of the example child 102, the example adult 106, and the example pet 110). Additionally or alternatively, the IoT devices 104, 108, and 112 may transmit raw sensor data and/or any other data collected and/or generated. In some examples in which the IoT devices 104, 108, and 112 classify data for local use (e.g., at an IoT device or within a local network associated with the IoT device), a server 130 may not be incorporated into the environment 100.

The example model generator 140 of the illustrated example generates optimized model(s) for use by the example IoT devices 104, 108, and 112 in classifying collected and/or generated data. For example, the model generator 104 of FIG. 1 analyzes sample data (e.g., data collected by IoT devices 104, 108, and 112 and/or data similar to the data to be collected by IoT devices 104, 108, and 112) and generates two classification models or sets of models (e.g., one classification model or set to be used for classifying audio data and one classification model or set to be used for classifying motion data). According to the illustrated example, the model generator 140 optimizes the model for use in the IoT devices 104, 108, and 112, which are of relatively limited computing power (e.g., much less computer resources and/or power supply/battery capabilities than a desktop or server computer). In addition, the example model generator 104 determines characteristics and settings to be used by the example IoT devices 104, 108, and 112 (e.g., sampling rate, buffer size, etc.).

Characteristics, settings, and generated classification model(s) are transferred to the example IoT devices 104, 108, and 112 via the example network 120. Alternatively, the characteristics, settings, and generated classification model(s) may be transferred to the IoT devices 104, 108, and 112 via a wired, wireless, local, and/or remote connection (e.g., the characteristics, settings, and generated classification model(s) may be transferred to the IoT devices 104, 108, and 112 by a manufacturer, assembler, distributor, etc. prior to the distribution of the IoT devices 104, 108, and 112).

The model generator 140 is described in further detail in conjunction with FIGS. 2-6.

In operation of the environment 100 of FIG. 1, the example model generator 140 collects sample data that is classified (e.g., manually classified data). The collected sample data may be representative of data that will be collected by the example IoT devices 104, 108, and 112 and/or may be collected by the example IoT devices 104, 108, and 112. The example model generator 140 trains and model(s) and performs optimizations (e.g., optimizing a sampling buffer, optimizing model size, optimizing feature selection) to balance classification accuracy with processor system resource needs for the IoT devices 104, 108, and 112. The example model generator 140 performs the optimization by iteratively adjusting parameters and conditions until a model that meets the platform constraints of the IoT devices 104, 108, and 112 is reached. Once an optimized model(s) is determined, the model(s) is deployed to the IoT devices 104, 108, and 112.

Figure 2:
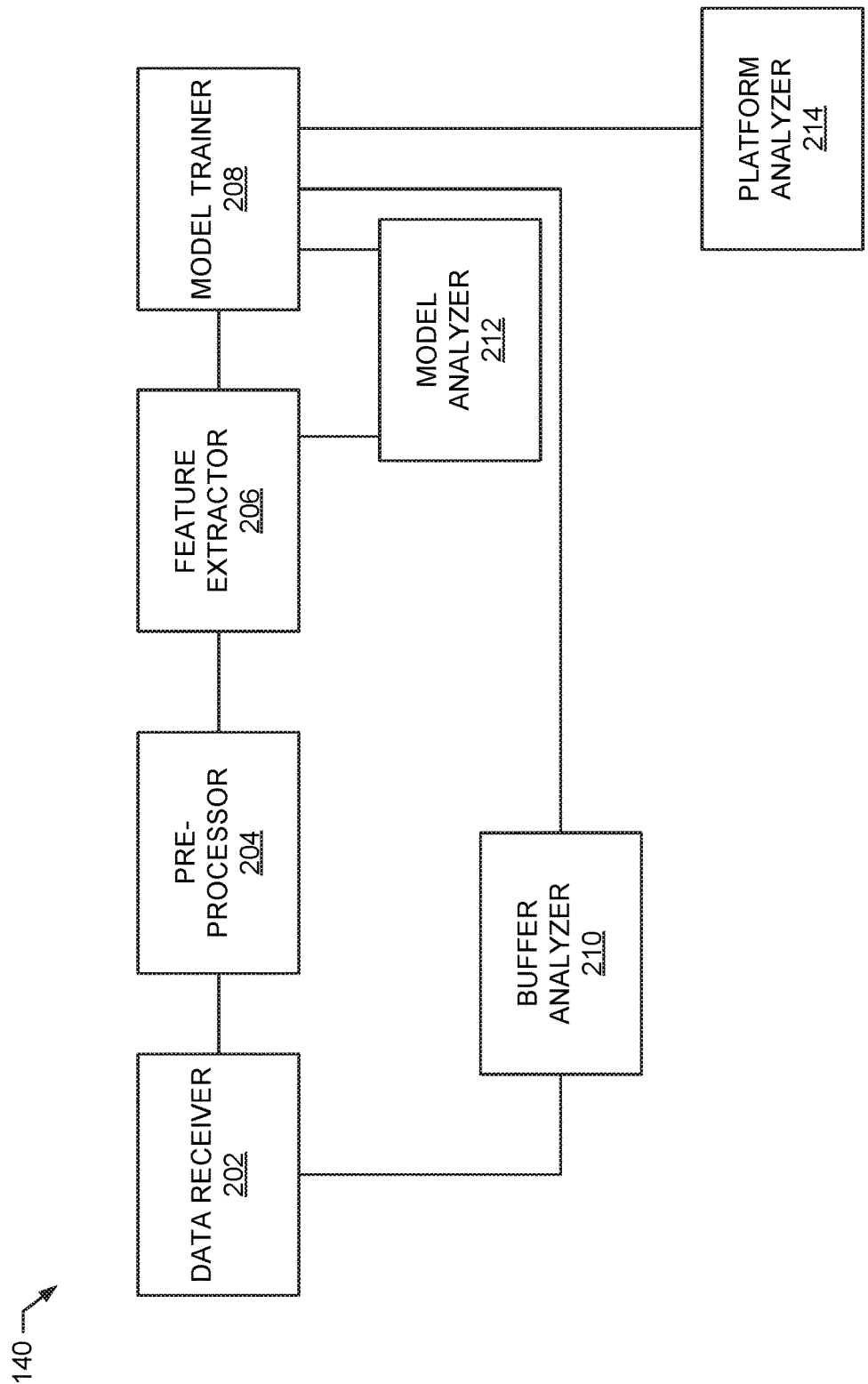
FIG. 2 is a block diagram of an example implementation of the model generator of FIG. 1.

FIG. 2 is a block diagram of an example implementation of the model generator 140 of FIG. 1. The example model generator 140 includes an example data receiver 202, an example pre-processor 204, an example feature extractor 206, an example model trainer 208, an example buffer analyzer 210, an example model analyzer 212, and an example platform analyzer 214.

The example data receiver 202 receives data for use in generating classification models and platform parameters. According to the illustrated example, the data receiver 202 receives data from the example server 130, wherein the data is similar to data that will later be collected by the IoT devices 104, 108, and 112. According to the illustrated example, the data is training data collected by the example IoT devices 104, 108, and 112. For example, the IoT devices 104, 108, and 112 may be placed in a training mode in which the raw sensor data is collected and/or transmitted to the example server 130 for use by the model generator 140 in training a model. The training data may be labeled by a user of the IoT devices 104, 108, and 112, by a person associated with the server 130, by an automated classification process associated with the server 130, etc. Alternatively, data from other sources may be collected using sensors similar to or the same as those used by the example IoT devices 104, 108, and 112 in environments similar to the environments in which the IoT devices 104, 108, and 112 will be deployed. The example data has been classified to assign meaning to selections of data (e.g., selections of data may be respectively classified as running, walking, sleeping, sitting, barking, whining, howling, etc.).

The example data receiver 202 samples the received data according to a sampling frequency. According to the illustrated example, the data receiver 202 initially utilizes a baseline sampling frequency (e.g., a default sampling frequency or a frequency selected by a user/administrator). Lower frequencies reduce the computational complexity of analysis by reducing the frequency at which samples must be generated and reducing the overall number of samples. The sampling frequency is later adjusted as part of optimization.

The data sampled by the data receiver 202 is buffered. The size of the buffer may be optimized to determine an optimal buffer size to be utilized by the IoT devices 104, 108, and 112. The example data receiver 202 adjusts a buffer window as different sampling frequencies are selected until the point at which the accuracy of the classifier uses the parameters is determined to just meet a threshold accuracy (e.g., the next adjustment would take the accuracy outside the threshold).

The example pre-processor 204 performs pre-processing of the received data. For example, the pre-processing may include normalization, filtering, transforming, etc. The particular pre-processing applied depends on the type of data analyzed. For example, the pre-processor 204 may process audio data to remove ambient audio/noise, may analyze frequency characteristics of the audio to identify bands in which the most energy of the audio lies, etc. The pre-processor 204 may utilize time-domain thresholding such as multi-thresholding on signal magnitude in the time domain go identify a region in which extracting relevant audio (e.g., dog sounds in a dog analyzing system) is found. Threshold values may be computed by recording various kinds of sounds with ambient noise. In other examples, a full spectrum analysis in the frequency domain may be performed if the IoT devices 104, 108, 114 may be capable of such an analysis once the platform is deployed.

The example feature extractor 206 extracts features from the data for use in training the classification model(s). The features to be extracted depend on the particular data analyzed. For example, audio data that includes speech may be analyzed by extracting Mel-frequency cepstral coefficients (MFCC). To increase the suitability for use in limited resource devices such as IoT devices 104, 108, and 112, a fixed point implementation of MFCC may be utilized. In another example, for motion data, features such as zero crossing rate, acceleration magnitude, $75^{th}$ percentile on magnitude, standard deviation of accelerometer values, etc.).

The example model trainer 208 analyzes the received features to train a classifier based on the indicated classification data (e.g., using supervised machine learning). The example trainer 208 may utilize any type of machine learning algorithm such as regression, principal component analysis (PCA), k-nearest neighbor, k-means clustering, radial basis function, feedforward neural network, etc. For example, the model trainer 208 may train multiple models The example model analyzer 212 analyzes the accuracy of the model (e.g., by performing classification of already classified data to determine an accuracy). For example, the model analyzer 212 may apply a set of data to the classification model and determine a level of accuracy by comparing a result from the classifier to identified classifications (e.g., labeled data).

The example buffer analyzer 210 analyzes the results of the analysis by the example model analyzer 212 to determine if optimization of the sampling frequency and buffer settings are to be performed. After optimizing the sampling frequency and buffer settings, the classification of data and analysis of accuracy is performed. For example, the buffer analyzer 210 may use a step function to adjust the sampling frequency and then may adjust a buffer size.

The example platform analyzer 214 determines if the platform and models as optimized is compatible with the IoT devices 104, 108, and 112. For example, the platform analyzer 214 determines if the memory footprint, the power budget, etc. are compatible with the characteristics of the IoT devices 104, 108, and 112. If the platform analyzer 214 determines that the platform and/or models are not compatible with the IoT devices 104, 108, and 112 (e.g., that compute latency does not meet a threshold, memory footprint exceeds the capabilities of the IoT devices 104, 108, and 112, combined pipeline does not meet power budget for the IoT devices 104, 108, 112, etc.), the platform analyzer 214 adjusts an accuracy tolerance threshold and restarts the optimization.

While an example manner of implementing the model generator 140 of FIG. 1 is illustrated in FIG. 2, one or more of the elements, processes and/or devices illustrated in FIG. 2 may be combined, divided, re-arranged, omitted, eliminated and/or implemented in any other way. Further, the example data receiver 202, the example pre-processor 204, the example feature extractor 206, the example model trainer 208, the example buffer analyzer 210, the example model analyzer 212, the example platform analyzer 214 and/or, more generally, the example model generator 140 of FIG. 2 may be implemented by hardware, software, firmware and/or any combination of hardware, software and/or firmware. Thus, for example, any of the example data receiver 202, the example pre-processor 204, the example feature extractor 206, the example model trainer 208, the example buffer analyzer 210, the example model analyzer 212, the example platform analyzer 214 and/or, more generally, the example model generator 140 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data receiver 202, the example pre-processor 204, the example feature extractor 206, the example model trainer 208, the example buffer analyzer 210, the example model analyzer 212, the example platform analyzer 214 and/or, more generally, the example model generator 140 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example model generator 140 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the model generator 104 of FIGS. 1 and/or 2 is shown in FIGS. 3-6. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 3-6, many other methods of implementing the example model generator 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 3-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 3:
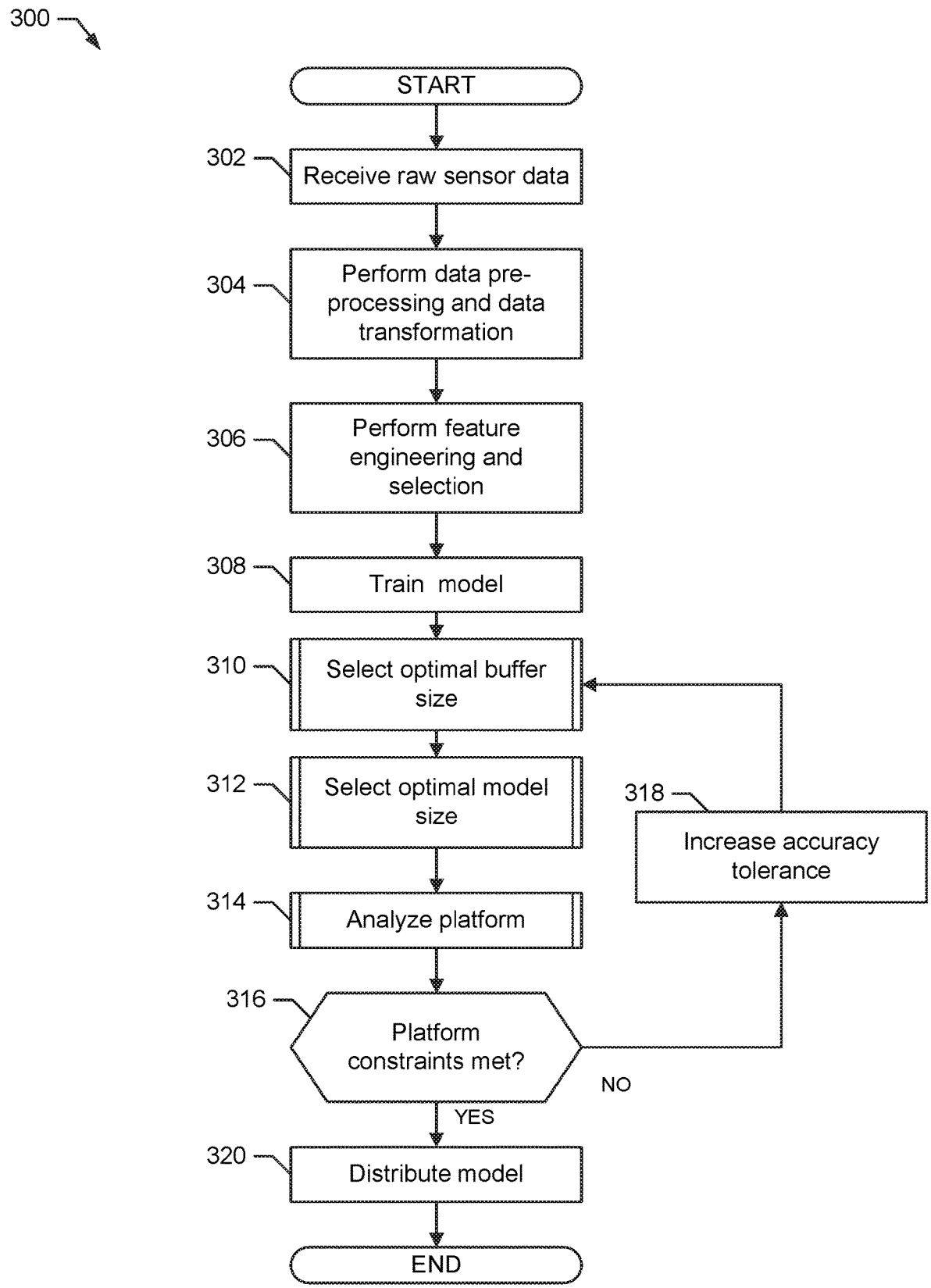
FIGS. 3-6 are flowcharts representative of machine readable instructions which may be executed to implement the model generator of FIG. 1 and/or FIG. 2.

The program 300 of FIG. 3 begins at block 302 when the data receiver 202 receives raw sensor data (block 302). According to the illustrated example, the data receiver 202 samples the data using a baseline sampling rate as the data is received. The raw sensor data may be training data that is generated specifically for training or may be live/production data that is collected and classified.

The example pre-processor 204 performs pre-processing and data transformation (block 304). The particular pre-processing and data transformation are utilized is dependent on the type of data being analyzed.

The example feature extractor 206 then extracts features from the processed data (block 306). For example, the feature extractor 206 initially extracts a baseline number of particular features.

The example model trainer 208 then trains a classification model using the extracted features (block 308). The model trainer 208 may utilize any type of training and classification model such as a supervised machine learning model when the training data includes classifications and/or unsupervised machine learning when the training data does not include classification information.

The example buffer analyzer 210 then analyzes the buffer size and/or sampling frequency to select an optimal buffer size and sampling frequency (block 310). An example implementation of the buffer and sampling analysis of block 310 is described in conjunction with FIG. 4.

The example model analyzer 212 then analyzes then optimizes the feature selection to reduce the feature set to reduce the computational complexity of an analysis while maintaining a threshold accuracy level (block 312). An example implementation of the feature selection optimization of block 312 is described in conjunction with FIG. 5.

The example platform analyzer 214 then analyzes the characteristics of a platform that will be needed to implement the model classification and platform and compares the characteristics to characteristics of the IoT devices 104, 108, and 112 (block 314). An example implementation of the platform analysis of block 314 is described in conjunction with FIG. 6.

The example platform analyzer 214 then determines if the characteristics of the designed platform are compatible with the IoT devices 104, 108, and 112 (block 316). For example, the platform analyzer 214 may determine if memory constraints are met, if a latency meets a threshold, if a power requirement meets a power available in the IoT devices 104, 108, and 112, etc. When the device constraints are not met, the example platform analyzer 214 increases an accuracy tolerance threshold (block 318) and control returns to block 310 to perform another round of optimizations.

When the device constraints are met by the optimized model development (block 316), the example platform analyzer 214 distributes the model and determined platform parameters to the example IoT device 104, 108, and 112 (block 320). For example, the model and parameters may be distributed to IoT devices in the field. Alternatively, the model and parameters may be utilized in designing, manufacturing, assembling, configuring, etc. IoT devices prior to deployment.

While FIG. 3 illustrates an example flow in which a single sensor data is analyzed, the process 300 of FIG. 3 may be utilized in conjunction with data from multiple sensors. For example, a device for monitoring a living creature (e.g., a human, a pet, a farm animal, etc.) may include an audio sensor and a motion sensor. A device may include any number of sensors. An analysis for multiple sensors may include performing blocks 302-312 individually for data from each sensor. For example, data from an audio sensor may be analyzed by operation of blocks 302-312 substantially in parallel with data from a motion sensor being analyzed by operation of block 302-312. Following the completion of all block 312 operations (e.g., after performing block 312 for the audio data and after performing block 312 for the motion data), control may proceed to block 314. Similarly, if control returns to block 310 after operation of block 318, blocks 310 and 312 may be individually performed for data from each sensor. Accordingly, FIG. 3 may be implemented in a multi-modal pipeline approach to perform optimization across the data from multiple sensors using multiple models.

Figure 4:
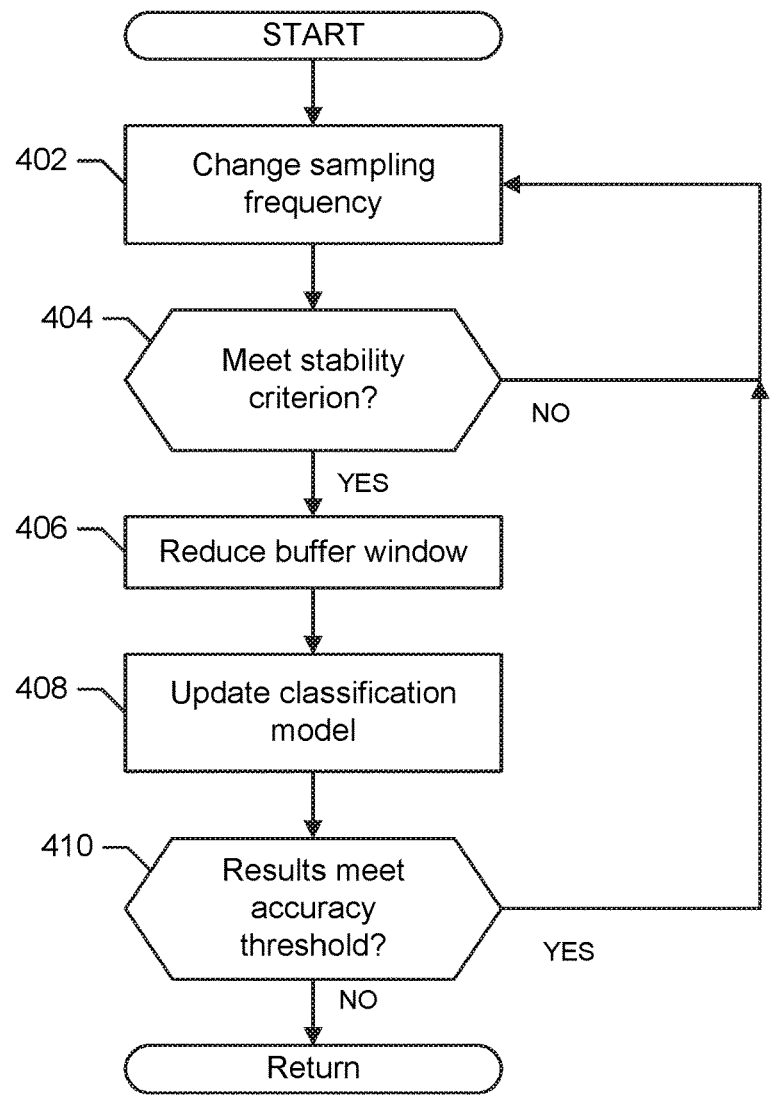

FIG. 4 is a flowchart of an example program 310 that may implement block 310 of FIG. 3 to select an optimal buffer size. The example program 310 of FIG. 4 begins when the example buffer analyzer 210 reduces the baseline sampling frequency (block 402). For example, the buffer analyzer 210 may reduce the sampling frequency by a factor of 2. The example data receiver 202 then determines if the sampling frequency meets Nyquist stability criterion for the input data (block 404). For example, if the maximum frequency of the data is 8 kHz, a sampling frequency must be greater than or equal to 16 kHz to avoid aliasing. If the sampling frequency does not meet the Nyquist stability criterion for the input data, control returns to block 402 to select a different sampling frequency (e.g., to select a sampling frequency intermediate to the reduced frequency and the starting frequency).

If the sampling frequency meets the Nyquist stability criterion, the example buffer analyzer 210 reduces the buffer window size based on the reduction of the sampling frequency for a specified time window (block 406). For example, the size of the buffer determines the rate of segmentation and memory requirements for the buffering. For example, the buffer size may be reduced by an incremental amount (e.g., 10 samples, 100 samples, etc.).

The example model trainer then updates the model using the updated sampling frequency and buffer size (block 408). The example model analyzer 212 then determines if a computed accuracy of the classifier is within an accuracy threshold (e.g., a threshold identifier by a user/administrator) (block 410). If the accuracy remains within the threshold, control returns to block 402 to attempt to further reduce the parameters for further optimization.

If the classification accuracy has stepped outside of the threshold, the process 310 of FIG. 4 ends and control returns to block 312 of FIG. 3.

Figure 5:
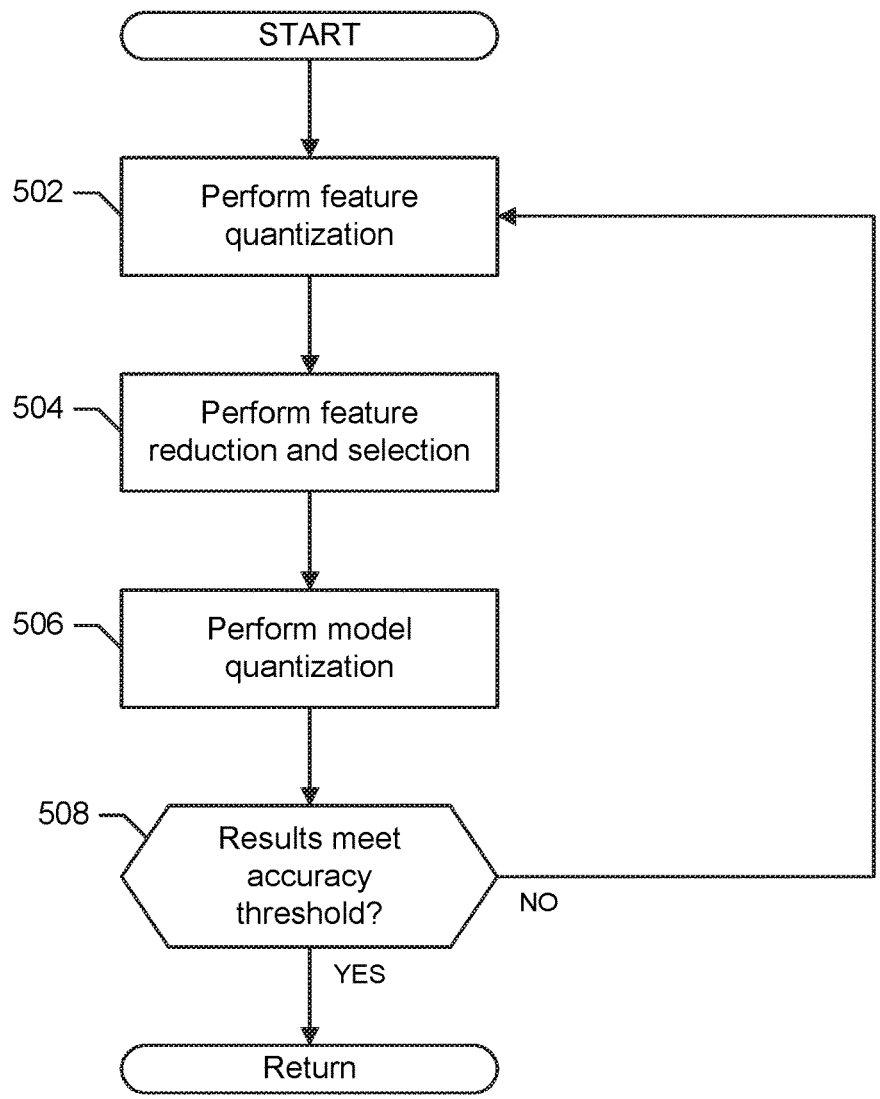

FIG. 5 is a flowchart of an example program 312 that may implement block 312 of FIG. 3 to select an optimal model size. The program 312 of FIG. 5 begins when the model analyzer 212 performs feature quantization (block 502). For example, the model analyzer 212 may implement fixed-point feature extraction from the sample data. The example model analyzer 212 then performs feature set reduction and selection (block 504). For example, the model analyzer 212 may utilize one or more analyses including correlation, variance, principal component analysis, clustering, pruning, etc. The model analyzer 212 may perform feature selection using, for example, feature importance and feature footprint to optimize the selection of features of increased importance and reduced footprint.

The example model trainer 208 then performs model quantization (block 506). For example, the model trainer 208 may sparsity the model for compression and/or map the model to a particular precision (e.g., 8-bit precision, 4-bit precision, etc.).

The example model analyzer 212 then determines if a computed accuracy of the classifier is within an accuracy threshold (e.g., a threshold identifier by a user/administrator) (block 508). If the accuracy remains within the threshold, control returns to block 502 to attempt to further reduce the features (e.g., each loop reduces more features and/or brings back features that were removed and selects different features).

If the classification accuracy has stepped outside of the threshold, the process 312 of FIG. 5 ends and control returns to block 314 of FIG. 3.

Figure 6:
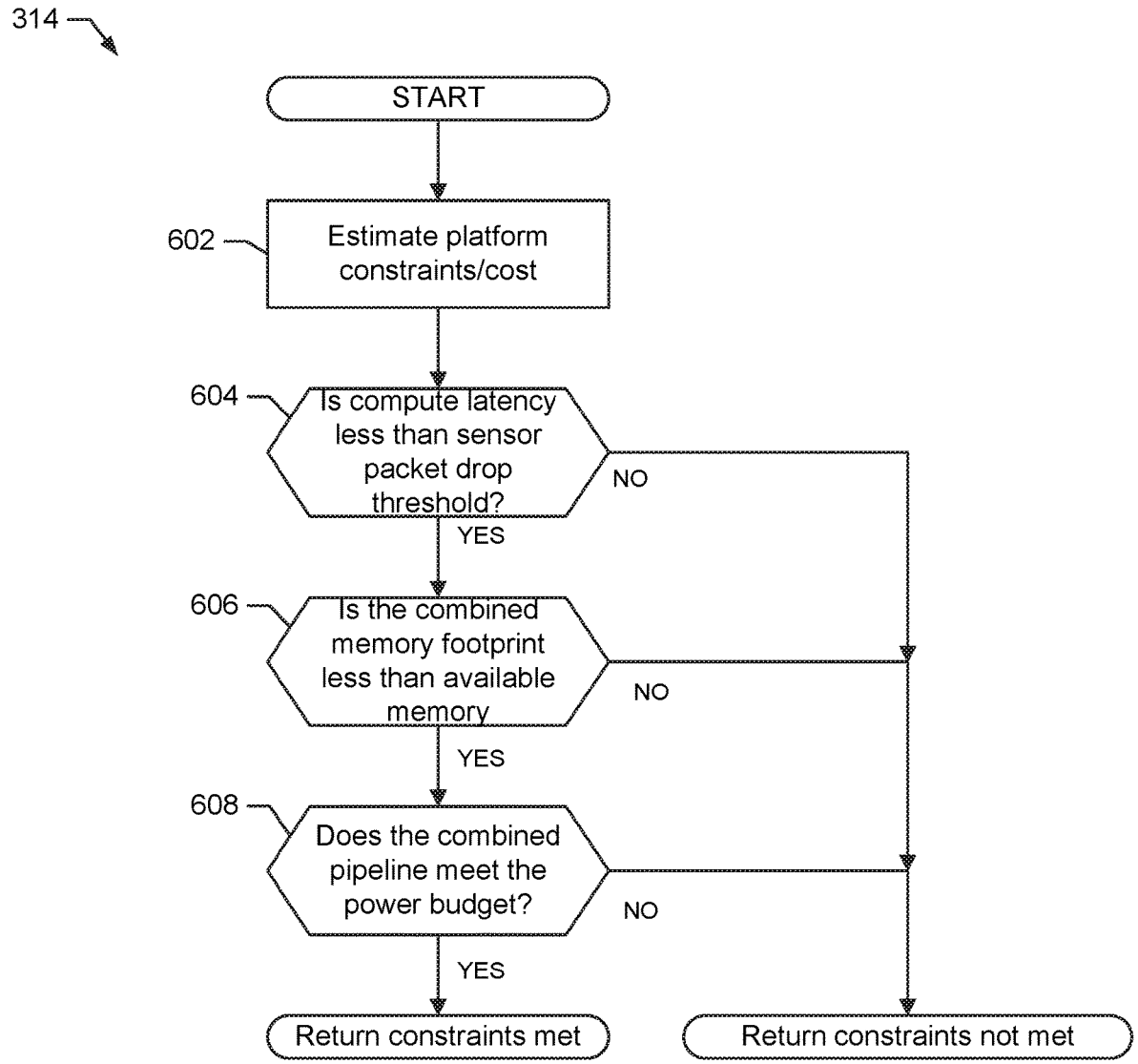

FIG. 6 is a flowchart of an example program 314 that may implement block 314 of FIG. 3 to analyze platform characteristics resulting from the optimization. The program 314 of FIG. 6 begins when the example platform analyzer 214 estimates platform constraints and costs (block 602). For example, the platform analyzer 214 computes the resulting buffer size, latency characteristics, power constraints, etc. for the classifier and platform parameters.

The example platform analyzer 214 then determines if the compute latency is less than a sensor packet drop threshold (block 604). For example, the platform analyzer 214 compares a rate at which a sensor of the IoT devices 104, 108, and 112 will provide a new sample and the rate at which the classification system will process samples to determine if packets will be dropped because the sensor supplies samples faster than they can be processed. When the compute latency is not less than a sensor packet drop threshold, the platform analyzer 214 returns that the constraints are not met to block 316 of FIG. 3.

The example platform analyzer 214 then determines if the combined memory footprint is less than an available memory of the IoT devices 104, 108, and 112 (block 606). For example, if the IoT devices 104, 108, and 112 include multiple sensors that each include their own classification pipelines including buffers and memory utilization, the platform analyzer combines the buffer and memory utilization characteristics and compares the result to the amount of available memory at the IoT devices 104, 108, and 112. When the combined memory footprint is not less than the memory available at the IoT devices 104, 108, and 112, the platform analyzer 214 returns that the constraints are not met to block 316 of FIG. 3.

The example platform analyzer 214 then determines if the combined pipeline meets a power budget for the IoT devices 104, 108, and 112 (block 608). For example, if the IoT devices 104, 108, and 112 include multiple sensors that each include their own classification pipelines, the platform analyzer combines the power utilization characteristics and compares the result to the power constraints and/or user/administrator set power budget characteristics of the IoT devices 104, 108, and 112. When the combined power utilization is not less than the power constraints/budget of the IoT devices 104, 108, and 112, the platform analyzer 214 returns that the constraints are not met to block 316 of FIG. 3.

If the evaluations of blocks 504-508 determine that the constraints of the platform are met, the platform analyzer 214 returns that the constraints are met to block 316 of FIG. 3.

Figure 7:
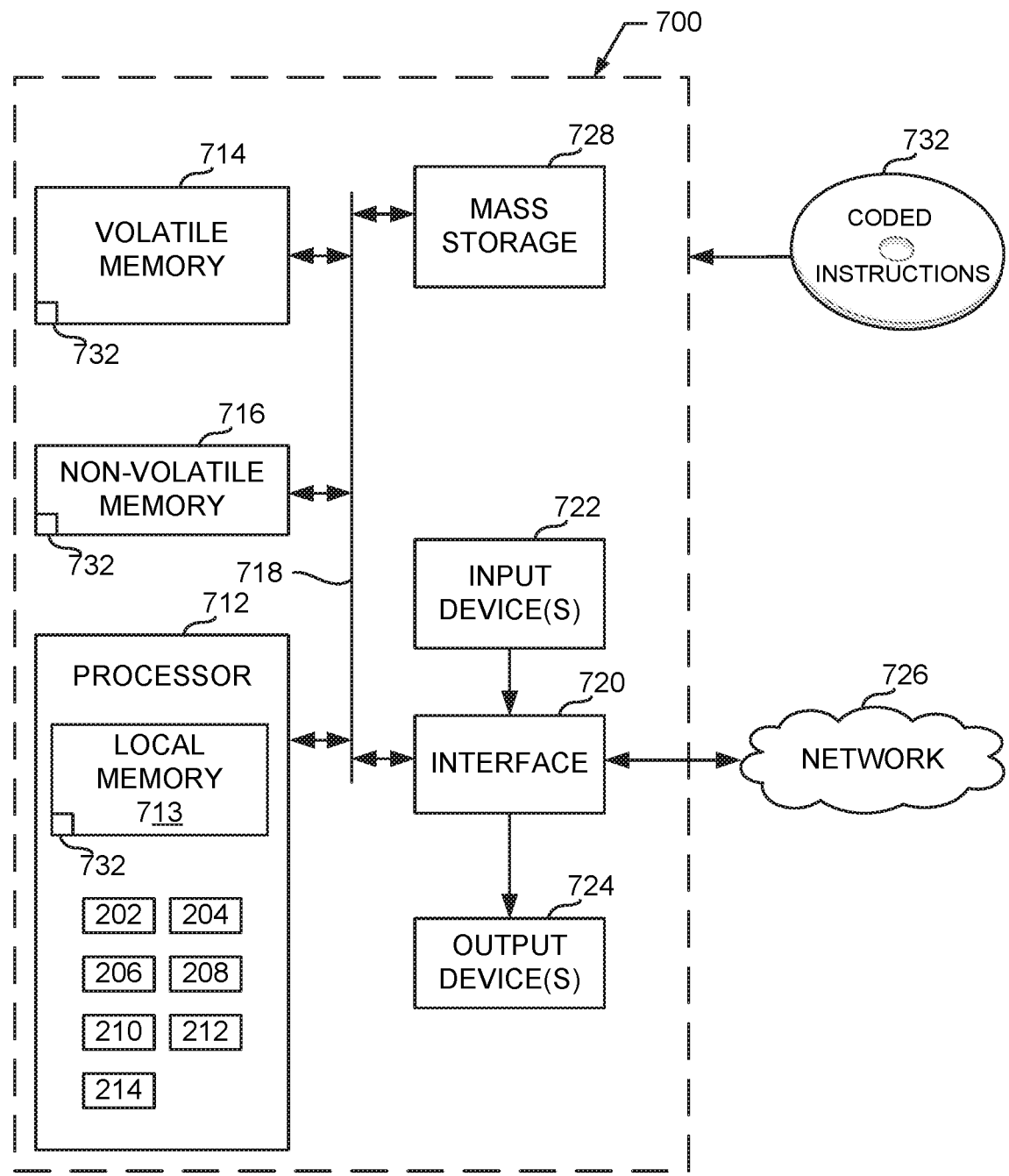
FIG. 7 is a block diagram of an example processing platform structured to execute the instructions of FIGS. 3-6 to implement the leak detector of FIG. 1 and/or FIG. 2.

FIG. 7 is a block diagram of an example processor platform 700 structured to execute the instructions of FIGS. 3-6 to implement the model generator 140 of FIG. 1 and/or FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data receiver 202, the example pre-processor 204, the example feature extractor 206, the example model trainer 208, the example buffer analyzer 210, the example model analyzer 212, and the example platform analyzer 214.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 3-6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that facilitate the generation of optimized models for processing of sensor data in lower power computing devices such as IoT devices. In some examples, the optimization of a machine learning model for use in the computing devices allows for data from multiple sensors to be simultaneously processed. The disclosed methods, apparatus and articles of manufacture are accordingly directed to one or more improvement(s) in the functioning of a computer.

Several examples are disclosed herein.

Example 1 includes an apparatus to distribute an analysis model in a computing system, the apparatus comprising a data receiver to collect data from a sensor of an internet of things device based a first sampling frequency and a buffer having a first buffer size, a model trainer to train a model based on the data collected from the sensor, a buffer analyzer to select a second sampling frequency and to reduce the buffer to a second buffer size, the model trainer to update the model based on the second buffer size, and a platform analyzer to determine a duration of time that that internet of things device will take to analyze sensor data based on the updated model, and in response to determining that the duration of time is greater than a rate at which the sensor will generate new data based on the second sampling frequency, triggering a further update to the model with an increased accuracy tolerance.

Example 2 includes an apparatus as defined in example 1, further including a feature extractor to extract features of the data for use by the model trainer in training the model.

Example 3 includes an apparatus as defined in example 2, further including a model analyzer to compare an accuracy of the updated model to the accuracy tolerance and trigger further changes to the second sampling frequency and the buffer when the accuracy meets the accuracy tolerance.

Example 4 includes an apparatus as defined in example 3, wherein the feature extractor is to perform feature quantization.

Example 5 includes an apparatus as defined in example 4, wherein the feature extractor is further to perform feature reduction to identify a reduced feature set.

Example 6 includes an apparatus as defined in example 5, wherein the feature extractor is further to perform model quantization.

Example 7 includes an apparatus as defined in example 5, wherein the model analyzer is to, after the feature reduction, determine if the accuracy of the updated model using the reduced feature set meets the accuracy tolerance.

Example 8 includes an apparatus as defined in example 7, wherein, when the model analyzer determines that the accuracy of the updated model does not meet the accuracy tolerance, the feature extractor is to add features removed from the reduced feature set back to the feature set and select different features for removal.

Example 9 includes an apparatus as defined in example 1, wherein the platform analyzer is further to determine a combined memory footprint to be utilized for classification using the updated model, and in response to determining that the memory footprint is greater than an available memory of the internet of things device, trigger a further update to the model with an increased accuracy tolerance.

Example 10 includes an apparatus as defined in example 1, wherein the platform analyzer is further to determine a combined power usage to be utilized for classification using the updated model, and in response to determining that the power usage is greater than an available power budget of the internet of things device, trigger a further update to the model with an increased accuracy tolerance.

Example 11 includes a non-transitory computer readable storage medium comprising instructions that, when executed, cause a machine to collect data from a sensor of an internet of things device based a first sampling frequency and a buffer having a first buffer size, train a model based on the data collected from the sensor, select a second sampling frequency and to reduce the buffer to a second buffer size, update the model based on the second buffer size, determine a duration of time that that internet of things device will take to analyze sensor data based on the updated model, and in response to determining that the duration of time is greater than a rate at which the sensor will generate new data based on the second sampling frequency, trigger a further update to the model with an increased accuracy tolerance.

Example 12 includes a non-transitory computer readable storage medium as defined in example 11, wherein the instructions, when executed, cause the machine to extract features of the data for use in training the model.

Example 13 includes a non-transitory computer readable storage medium as defined in example 11, wherein the instructions, when executed, cause the machine to compare an accuracy of the updated model to the accuracy tolerance and trigger further changes to the second sampling frequency and the buffer when the accuracy meets the accuracy tolerance.

Example 14 includes a non-transitory computer readable storage medium as defined in example 13, wherein the instructions, when executed, cause the machine to perform feature quantization.

Example 15 includes a non-transitory computer readable storage medium as defined in example 14, wherein the instructions, when executed, cause the machine to perform feature reduction to identify a reduced feature set.

Example 16 includes a non-transitory computer readable storage medium as defined in example 15, wherein the instructions, when executed, cause the machine to perform model quantization.

Example 17 includes a non-transitory computer readable storage medium as defined in example 15, wherein the instructions, when executed, cause the machine to, after the feature reduction, determine if the accuracy of the updated model using the reduced feature set meets the accuracy tolerance.

Example 18 includes a non-transitory computer readable storage medium as defined in example 17, wherein the instructions, when executed, cause the machine to, when the accuracy of the updated model does not meet the accuracy tolerance, add features removed from the reduced feature set back to the feature set and select different features for removal.

Example 19 includes a non-transitory computer readable storage medium as defined in example 11, wherein the instructions, when executed, cause the machine to determine a combined memory footprint to be utilized for classification using the updated model, and in response to determining that the memory footprint is greater than an available memory of the internet of things device, trigger a further update to the model with an increased accuracy tolerance.

Example 20 includes a non-transitory computer readable storage medium as defined in example 11, wherein the instructions, when executed, cause the machine to determine a combined power usage to be utilized for classification using the updated model, and in response to determining that the power usage is greater than an available power budget of the internet of things device, trigger a further update to the model with an increased accuracy tolerance.

Example 21 includes a method to distribute an analysis model in a computing system, the method comprising collecting data from a sensor of an internet of things device based a first sampling frequency and a buffer having a first buffer size, training a model based on the data collected from the sensor, selecting a second sampling frequency and to reduce the buffer to a second buffer size, updating the model based on the second buffer size, determining a duration of time that that internet of things device will take to analyze sensor data based on the updated model, and in response to determining that the duration of time is greater than a rate at which the sensor will generate new data based on the second sampling frequency, triggering a further update to the model with an increased accuracy tolerance.

Example 22 includes a method as defined in example 21, further including extracting features of the data for use in training the model.

Example 23 includes a method as defined in example 21, further including comparing an accuracy of the updated model to the accuracy tolerance and trigger further changes to the second sampling frequency and the buffer when the accuracy meets the accuracy tolerance.

Example 24 includes a method as defined in example 23, further including performing feature quantization.

Example 25 includes a method as defined in example 24, further including performing feature reduction to identify a reduced feature set.

Example 26 includes a method as defined in example 25, further including performing model quantization.

Example 27 includes a method as defined in example 25, further including determining if the accuracy of the updated model using the reduced feature set meets the accuracy tolerance.

Example 28 includes a method as defined in example 27, further including, when the accuracy of the updated model does not meet the accuracy tolerance, adding features removed from the reduced feature set back to the feature set and select different features for removal.

Example 29 includes a method as defined in example 21, further including determining a combined memory footprint to be utilized for classification using the updated model, and in response to determining that the memory footprint is greater than an available memory of the internet of things device, triggering a further update to the model with an increased accuracy tolerance.

Example 30 includes a method as defined in example 21, further including determining a combined power usage to be utilized for classification using the updated model, and in response to determining that the power usage is greater than an available power budget of the internet of things device, triggering a further update to the model with an increased accuracy tolerance.

Example 31 includes a computer readable medium comprising first instructions that when executed cause a machine to at least one of distribute, configure, assemble, install, instantiate, retrieve, decompress, and decrypt second instructions for execution, the second instructions to, when executed, cause a machine to at least: collect data from a sensor of an internet of things device based a first sampling frequency and a buffer having a first buffer size, train a model based on the data collected from the sensor, select a second sampling frequency and to reduce the buffer to a second buffer size, update the model based on the second buffer size, determine a duration of time that that internet of things device will take to analyze sensor data based on the updated model, and in response to determining that the duration of time is greater than a rate at which the sensor will generate new data based on the second sampling frequency, trigger a further update to the model with an increased accuracy tolerance.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to distribute an analysis model in a computing system, the apparatus comprising:
    a data receiver to:
        collect first data from a first sensor of an internet of things device based on a first sampling frequency and a buffer having a first buffer size; and
        collect second data from a second sensor of the internet of things device based on the first sampling frequency and the buffer having the first buffer size;
    a model trainer to train a model based on the first data collected from the first sensor and the second data collected from the second sensor;
    a buffer analyzer to:
        select a second sampling frequency;
        calculate a classification accuracy of the trained model; and
        reduce the buffer to a second buffer size based on the classification accuracy;
    a model trainer to update the model based on the second buffer size; and
    a platform analyzer to:
        determine a duration of time that the internet of things device will take to analyze sensor data based on the updated model; and
        in response to determining that the duration of time is greater than a rate at which the first sensor or the second sensor will generate new data based on the second sampling frequency, triggering a further update to the model with an increased accuracy tolerance.

2. An apparatus as defined in claim 1, further including a feature extractor to extract features of the first data and the second data for use by the model trainer in training the model.

3. An apparatus as defined in claim 2, further including a model analyzer to compare an accuracy of the updated model to the accuracy tolerance and trigger further changes to the second sampling frequency and the buffer when the accuracy meets the accuracy tolerance.

4. An apparatus as defined in claim 3, wherein the feature extractor is to perform feature quantization.

5. An apparatus as defined in claim 4, wherein the feature extractor is further to perform feature reduction to identify a reduced feature set.

6. An apparatus as defined in claim 5, wherein the feature extractor is further to perform model quantization.

7. An apparatus as defined in claim 5, wherein the model analyzer is to, after the feature reduction, determine if the accuracy of the updated model using the reduced feature set meets the accuracy tolerance.

8. An apparatus as defined in claim 7, wherein, when the model analyzer determines that the accuracy of the updated model does not meet the accuracy tolerance, the feature extractor is to add features removed from the reduced feature set back to the feature set and select different features for removal.

9. An apparatus as defined in claim 1, wherein the platform analyzer is further to:
    determine a combined memory footprint to be utilized for classification using the updated model; and
    in response to determining that the memory footprint is greater than an available memory of the Internet of Things device, trigger a further update to the model with an increased accuracy tolerance.

10. An apparatus as defined in claim 1, wherein the platform analyzer is further to:
    determine a combined power usage to be utilized for classification using the updated model; and
    in response to determining that the power usage is greater than an available power budget of the Internet of Things device, trigger a further update to the model with an increased accuracy tolerance.

11. A non-transitory computer readable storage medium comprising instructions that, when executed, cause a machine to:
    collect first data from a first sensor of an internet of things device based on a first sampling frequency and a buffer having a first buffer size;
    collect second data from a second sensor of the internet of things device based on the first sampling frequency and the buffer having the first buffer size;
    train a model based on the first data collected from the first sensor and the second data collected from the second sensor;
    select a second sampling frequency;
    calculate a classification accuracy of the trained model;
    reduce the buffer to a second buffer size based on the classification accuracy;
    update the model based on the second buffer size;
    determine a duration of time that the internet of things device will take to analyze sensor data based on the updated model; and
    in response to determining that the duration of time is greater than a rate at which the first sensor or the second sensor will generate new data based on the second sampling frequency, trigger a further update to the model with an increased accuracy tolerance.

12. A non-transitory computer readable storage medium as defined in claim 11, wherein the instructions, when executed, cause the machine to extract features of the first data and the second data for use in training the model.

13. A non-transitory computer readable storage medium as defined in claim 11, wherein the instructions, when executed, cause the machine to compare an accuracy of the updated model to the accuracy tolerance and trigger further changes to the second sampling frequency and the buffer when the accuracy meets the accuracy tolerance.

14. A non-transitory computer readable storage medium as defined in claim 13, wherein the instructions, when executed, cause the machine to perform feature quantization.

15. A non-transitory computer readable storage medium as defined in claim 14, wherein the instructions, when executed, cause the machine to perform feature reduction to identify a reduced feature set.

16. A non-transitory computer readable storage medium as defined in claim 15, wherein the instructions, when executed, cause the machine to perform model quantization.

17. A non-transitory computer readable storage medium as defined in claim 15, wherein the instructions, when executed, cause the machine to, after the feature reduction, determine if the accuracy of the updated model using the reduced feature set meets the accuracy tolerance.

18. A non-transitory computer readable storage medium as defined in claim 17, wherein the instructions, when executed, cause the machine to, when the accuracy of the updated model does not meet the accuracy tolerance, add features removed from the reduced feature set back to the feature set and select different features for removal.

19. A non-transitory computer readable storage medium as defined in claim 11, wherein the instructions, when executed, cause the machine to:
determine a combined memory footprint to be utilized for classification using the updated model; and
in response to determining that the memory footprint is greater than an available memory of the Internet of Things device, trigger a further update to the model with an increased accuracy tolerance.

20. A non-transitory computer readable storage medium as defined in claim 11, wherein the instructions, when executed, cause the machine to:
determine a combined power usage to be utilized for classification using the updated model; and
in response to determining that the power usage is greater than an available power budget of the Internet of Things device, trigger a further update to the model with an increased accuracy tolerance.

21. A method to distribute an analysis model in a computing system, the method comprising:
collecting first data from a first sensor of an internet of things device based on a first sampling frequency and a buffer having a first buffer size;
collecting second data from a second sensor of the internet of things device based on the first sampling frequency and the buffer having the first buffer size;
training a model based on the first data collected from the first sensor and the second data collected from the second sensor;
selecting a second sampling frequency;
calculating a classification accuracy of the trained model;
reducing the buffer to a second buffer size based on the classification accuracy;
updating the model based on the second buffer size;
determining a duration of time that the internet of things device will take to analyze sensor data based on the updated model; and
in response to determining that the duration of time is greater than a rate at which the first sensor or the second sensor will generate new data based on the second sampling frequency, triggering a further update to the model with an increased accuracy tolerance.

22. A method as defined in claim 21, further including extracting features of the first data and the second data for use in training the model.

23. A method as defined in claim 21, further including comparing an accuracy of the updated model to the accuracy tolerance and trigger further changes to the second sampling frequency and the buffer when the accuracy meets the accuracy tolerance.

24. A method as defined in claim 23, further including performing feature quantization.

25. A method as defined in claim 24, further including performing feature reduction to identify a reduced feature set.

26. The apparatus as defined in claim 1, wherein the first data and the second data represent different types of data.

27. The non-transitory computer readable storage medium as defined in claim 11, wherein the first data and the second data represent different types of data.

28. The method as defined in claim 21, wherein the first data and the second data represent different types of data.

* * * * *